United States Patent

Hoekstra

[11] Patent Number: 5,929,931
[45] Date of Patent: Jul. 27, 1999

[54] LOCAL COMMUNICATION SYSTEM AND STATION FOR USE IN SUCH A SYSTEM

[75] Inventor: Jelle Hoekstra, Eindhoven, Netherlands

[73] Assignee: D2B Systems Company Limited, New York, N.Y.

[21] Appl. No.: 08/353,415

[22] Filed: Dec. 9, 1994

[30] Foreign Application Priority Data

Dec. 10, 1993 [GB] United Kingdom .................. 9325300

[51] Int. Cl.$^6$ ............................................... H04N 5/445
[52] U.S. Cl. ......................... 348/569; 348/564; 348/589
[58] Field of Search ................................. 348/563, 564, 348/569, 570, 584, 589, 600, 601, 552, 553; H04N 5/445, 5/262, 5/278

[56] References Cited

U.S. PATENT DOCUMENTS 4,821,102  4/1989  Ichikawa et al. ...................... 348/569

FOREIGN PATENT DOCUMENTS

| 0369382 | 5/1990 | European Pat. Off. | ........ H04L 12/28 |
| 0505006 | 9/1992 | European Pat. Off. | .......... H04B 1/20 |
| 0535749 | 4/1993 | European Pat. Off. | ......... H02J 13/00 |
| 0013884 | 1/1986 | Japan | .............................. H04N 5/445 |
| 0106276 | 5/1991 | Japan | .............................. H04N 5/445 |

*Primary Examiner*—David E. Harvey
*Attorney, Agent, or Firm*—Gregory L. Thorne

[57] ABSTRACT

A local communication system has a number of stations connected for the communication of messages by one or more data channels. One of the stations comprises a display device operable to display messages sent by other stations in one or more of a plurality of fields. Each message to be displayed is given a display lifetime (80–84), which is determined by a mode value (74–78) set by the originating subdevice or commonly assigned by the display device. The display determines whether there are sufficient display fields available (68) to display a received message and handles the timing (88) and subsequent removal from display (90) of a message on expiry of its display lifetime, independently of the originating station.

8 Claims, 3 Drawing Sheets

LOCAL COMMUNICATION SYSTEM AND STATION FOR USE IN SUCH A SYSTEM

The invention relates to a local communications system, and to a device for use in such a system. In particular the present invention relates to a local communications system comprising a plurality of devices interconnected for the communication of messages via one or more data channels, each device including at least one functional subdevice element, the subdevices in the system including a user output subdevice for displaying user-readable messages to a user of the system, a user-readable message being determined by status information of a device, composed into a user-readable message by the subdevice element of that device, and transmitted directly or indirectly to the user output subdevice for display.

Examples of local communication system of the type set forth in the opening paragraph are described in our European patent applications EP-A-0505006 (PHQ91010) and EP-A-0535749 (PHQ 91036).

A problem with existing systems is the requirement for an originating subdevice to monitor the display of messages sent.

According to the present invention there is provided a system as set forth in the opening paragraph, characterised in that each user-readable message is assigned a display lifetime and, independently of the originating subdevice of a message, the user output subdevice times the message and removes the message from display on expiration of its lifetime.

The use of lifetimes, which may be assigned by the originating subdevice and indicated in the first field of a message or commonly assigned to all messages regardless of origin by the user output subdevice, allows simplification of originating subdevices which would no longer be required to time their own messages and issue requests for removal of messages at the end of their lifetime.

The invention further provides a display device operable to display messages and handle the timing of message lifetimes in the manner of the user output subdevice in the system hereinbefore described. Further aspects and features of the invention will become apparent from reading the following description and claims.

Embodiments of the invention will now be described, by way of example, with reference to the accompanying drawings, in which.

Figure 1:
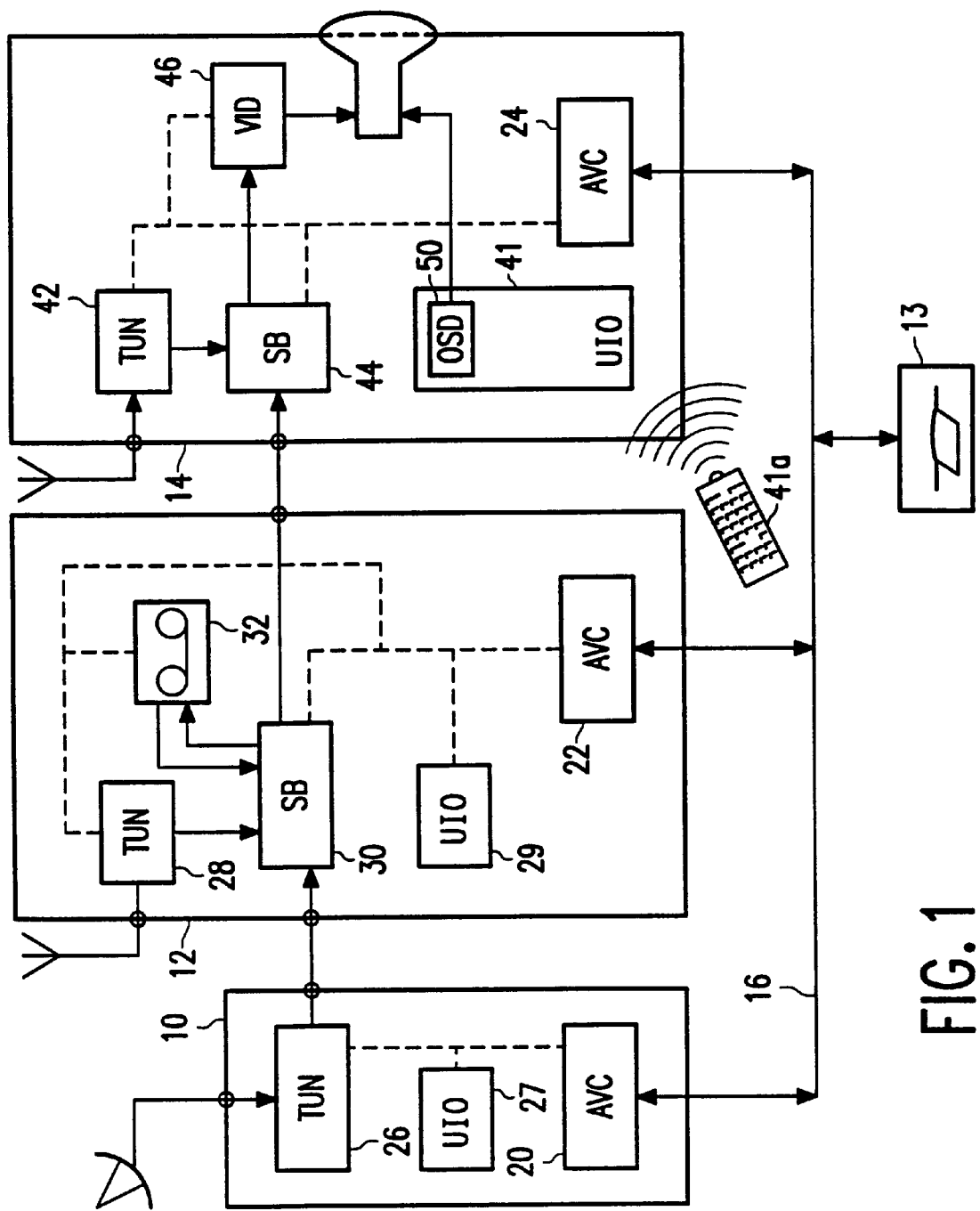
FIG. 1 shows a domestic audio/video system embodying the invention.

FIG. 1 shows a domestic video entertainment system comprising a satellite broadcast tuner 10, a video cassette recorder (VCR) 12, a Smart card reader 13 and a television receiver 14, all connected to a serial data bus 16. Video and audio signals are passed within and between the devices 10, 12 and 14 using, for example, SCART (Euroconnector) plugs, sockets and multiwire cables.

The serial data bus provides for distributed control of the bus, and allows commands and other messages to be uniquely addressed for specific "devices", such as the apparatuses 10, 12, 13 and 14, and also for specific "subdevices" within each device.

Within each of the devices 10, 12 and 14 there are shown blocks representing subdevices. The division of a device into subdevices is necessary only in a logical sense, that is to say, from the point of view of its behaviour relative to the serial bus 16. In the physical implementation of the device, there may or may not be corresponding separate physical subdevices. In fact, in the embodiment shown, each device includes one audio/video controller (AVC) type of subdevice which provides the control and systematic interrogation intelligence for all subdevices within that device, relaying system messages to and from those subdevices as indicated by the dotted data paths in FIG. 1. The AVC subdevices also provide the (distributed) controlling logic of the system as a whole, interpreting user commands and controlling the operation of the system accordingly. Often, the control logic of the AVC and some or all of the other subdevices will be integrated using a single programmed microcontroller. Other subdevices not shown in FIG. 1 will generally be included in such a system, including timers, audio amplifiers, and so forth, and the subdevices described herein are presented as a representative sample only.

In the satellite tuner device 10, a tuner subdevice 26 (TUN) performs the signal processing functions necessary to provide baseband video signals to the connected devices. The AVC subdevice 20 receives user instructions from a user input/output (User I/O) subdevice 27 (UIO) (the front panel and/or remote control of the satellite tuner) and system messages from the bus 16, and operates to select channels, keep track of preset channel selections and so forth.

The VCR device 12 includes its AVC subdevice 22, and also a User I/O subdevice 29 (UIO), a terrestrial broadcast tuner subdevice 28 (TUN), a switchbox subdevice 30 (SB) and a videotape record/replay deck 32.

The television receiver device 14 includes its AVC subdevice 24 and also a user input/output subdevice 41 (UIO), a terrestrial tuner subdevice 42 (TUN), a switchbox subdevice 44 (SB) and a video monitor subdevice 46 (VID). The User I/O subdevice 41 of the television receiver includes an on-screen display (OSD) function 50, as described hereinafter, and a remote control 41a for the receipt of user control signals.

In operation, the tuner subdevices 26,28 and 42 can be regarded as sources of video signals within the system. The video monitor subdevice 46 can act as a destination for video signals, and functions to display images to the user. The record/replay deck subdevice 32 can act as a source and/or a destination of video signals, depending on whether it is playing and/or recording at a given time.

Since the functional elements within the devices 10,12, 14 are addressable as system subdevices, any of the AVC subdevices 20,22,24 can take control of the bus and address commands to those subdevices. This is done for example by an AVC subdevice which has been informed of a user command by a User I/O subdevice and requires control of subdevices at various points in the system to implement the user's wishes.

System message formats for controlling the basic functions of certain common subdevices are defined, while scope is left for defining not only new commands, but also request and reply messages that enable one system device or subdevice to interrogate another as to its properties and status. Each switchbox subdevice 30 and 44 can be controlled via the bus (or by its associated AVC subdevice) to connect its output signal path(s) to a specified one of its input signal paths. For example, if a user indicates to the television receiver device 14 that it is desired to watch a certain satellite broadcast channel, suitably addressed and coded system messages can be sent via the bus 16 to ensure that the satellite tuner 10, VCR 12, card reader 13 and the television 14 are active, to cause the satellite tuner 10 to select the appropriate channel, to cause the VCR switchbox subdevice 30 and the television switchbox subdevice 44 to connect the appropriate signal path from source to destination. There are many ways of arranging these events with or without user intervention. For greatest user-friendliness, the whole process can be controlled by the AVC subdevice of the device which receives the user input. The information necessary for building the signal path from source to destination can be obtained by a suitable series of system request messages to the relevant devices and subdevices.

In order to provide a user-friendly user interface for the system, any AVC subdevice (hereinafter "AVC") may wish to display user messages using the on-screen display (OSD) facility 50 of the User I/O subdevice 41. For example, when the television is activated by a user and a signal path set up according to the user's wishes, the AVC 24 may wish to confirm visually for the user which channel is being watched.

Figure 2:
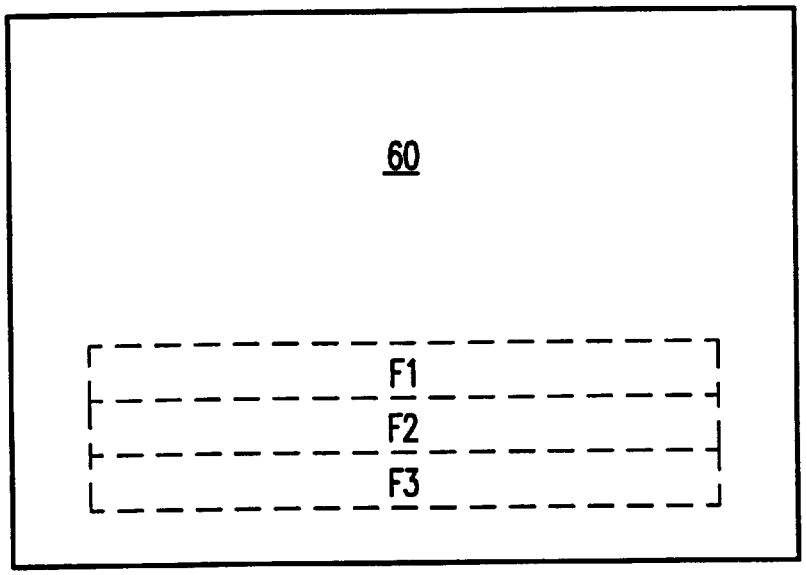
FIGS. 2 and 3 illustrate the positioning of message fields on a display.
Figure 3:
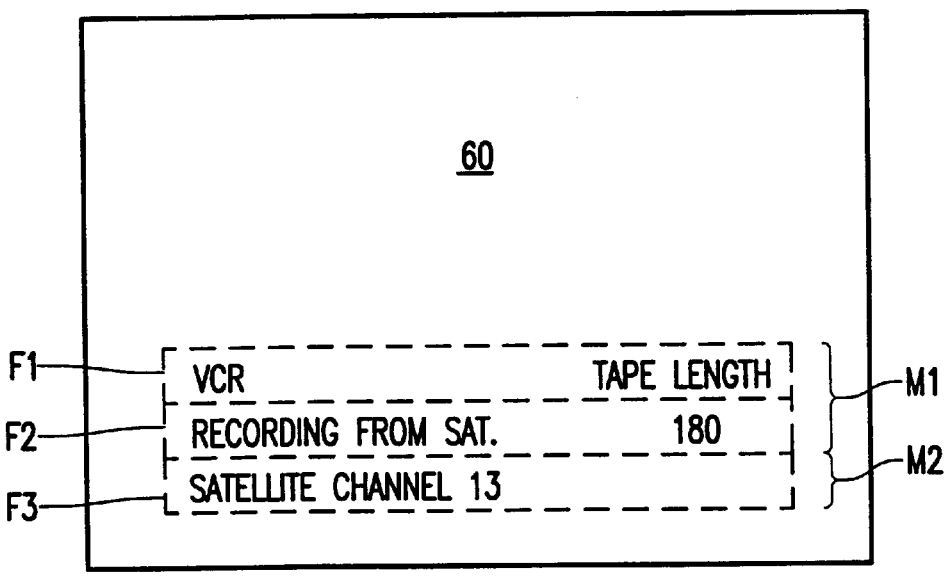

FIG. 2 shows a screen space 60 having three display fields F1, F2, F3 available: these are positioned near the bottom of the display to minimise the obscuring of television pictures. As shown in FIG. 3, a message M1 (in this case a status message from AVC 22 of the video recorder 12) may occupy more than one field F1, F2 as will be described hereinafter. As will also be described, if there are sufficient free fields, two or more messages may be displayed simultaneously, as shown by message M2 (from AVC 20 of satellite tuner 10) appearing in display field F3.

The control and operation of the OSD is determined by protocols for the dialogue language command, the OSD data and OSD status requests.

The dialogue language command may be used to select the language and character set to be used by a device receiving the command for generating OSD messages.

The response is in the format of the dialogue language command followed by a response code. The response code may take one of four values, namely "not implemented", "reject", "busy" or "completed". The response code 'not implemented' indicates that the device does not support this command or the specified operands. Response code 'reject' indicates that, whilst the device is generally able to execute the received command, it is unable to do so on this occasion due either to the same or another device command/request being received or the current state of the device preventing execution (for example the device is inactive or is in an emergency state). Response code 'busy' indicates that the device has received and is processing the command but the final response (either 'reject' or 'completed') is at present unknown: the final response will be sent on completion of processing. Response code "completed" indicates that the command was executed as specified, that is to say the language and character set specified by the dialogue language command has been selected.

Figure 4:
FIG. 4 illustrates an on-screen-display control function used in the system of FIG. 1.

The OSD data protocol defines the format of the display data transmitted. Data is transmitted in frames, the general format of which is as shown in FIG. 4, with single frame messages or the first frame of a multiple frame sequence carrying additional information to further frames as described below. When data is transmitted in a multiple frame sequence, locking is used to maintain the path from originating to destination device. The first frame locks the destination and the final frame unlocks it: a maximum number of frames (4 is preferred) is specified for a locked sequence. When a message needs to be displayed in multiple lines on the television screen, each line is sent as a separate frame sequence. When Japanese data is being transmitted, where each character requires 2 bytes of definition, care must be taken not to split any 2 byte character code between successive frames.

Preferably a timeout provision is made for locking whereby, if no message portion (frame) is received by the user output subdevice for a predetermined period when locked, the lock is removed and messages from other subdevices may again be accepted.

As shown in FIG. 4, all frames are made up of 13 bytes. The first byte (DTATR) indicates whether the OSD is European/American requiring 1 byte per character or Japanese (requiring 2 bytes), whilst the second (BYTE) indicates the number of DATA bytes following. The following DATA bytes (DATA1 to DATA 11) specify the OSD data to be displayed, although in the first frame of a frame sequence only 8 character data bytes are available (DATA4 to DATA 11), with the remaining bytes (DATA1 to DATA3) carrying control information relating respectively to the language and character set, the message mode, and the line sequence.

The byte for language and character set (DATA1) indicates the chosen character set and language, the code being as in the dialogue language command. The mode byte (DATA2) indicates the importance of the message as follows:

Normal: a normal message such as 'Play' sent from a VCR to indicate that a cassette is being played.

Important: an important message such as 'No Cassette' sent from a VCR when instructed to play or record and no cassette is present in the record/replay deck.

Alert: a warning message, such as 'Emergency'.

The line sequence byte (DATA3) provides one of two indications, depending on whether the frame is the first frame in the first line of a single or multiple line message, or whether the frame is the first frame in a subsequent line of a multiple line message. In the first line of a single or multiple line message, this byte indicates the total number of lines in the message, that is to say the number of frame sequences which will need to be received before the message is complete. In the first frame of a second or subsequent line of a multiple line message, the DATA3 byte may carry other data.

The OSD status request is sent from a device to a display subdevice to obtain information about the OSD function.

The response to the OSD status request includes an Answer byte indicating 'not implemented', 'reject' or 'completed'. An answer of 'not implemented' indicates that the display subdevice does not support the request or the option specified. An answer of 'reject' indicates that the display subdevice has the ability to execute the received request but is unable to do so on the present occasion due either to the same or another display subdevice command/request being received or the current state of the display device prevents execution (for example the display is inactive or is in an emergency state).

A 'completed' answer indicates that the display subdevice will display OSD data in the language and character set specified, and includes a level byte indicating the OSD level supported by the display device as shown in Table 1 below:

TABLE 1

| Level | Display device |
|---|---|
| 1st | Displays all modes (Normal, Important and Alert) in the same format. |
| 2nd | Supports separate formats for Normal and Important modes. Alert messages displayed |

TABLE 1-continued

| Level | Display device |
|---|---|
| | in the same format as important. |
| 3rd | Displays all modes in different formats. |

In order to simplify the operation of devices generating messages for display, the user output subdevice (the OSD function 50; FIG. 1) is given greater control of display than has heretofore been provided in, for example, the system of EP-A-0505006 (PHQ 91010) referred to earlier.

All OSD messages are given a fixed lifetime (suitably of at least four seconds) by the OSD function which also handles the removal of messages at the end of their lifetime. This removes the responsibility from each subdevice sending a message to be displayed for timing the display and subsequently sending a further message to the OSD function requesting removal of the message. As will be appreciated, this also reduces the number of messages on the interconnecting bus system. Should an originating subdevice wish to maintain a message on screen for longer than its specified lifetime, it is required to reissue the display instructions within the original lifetime.

Figure 5:
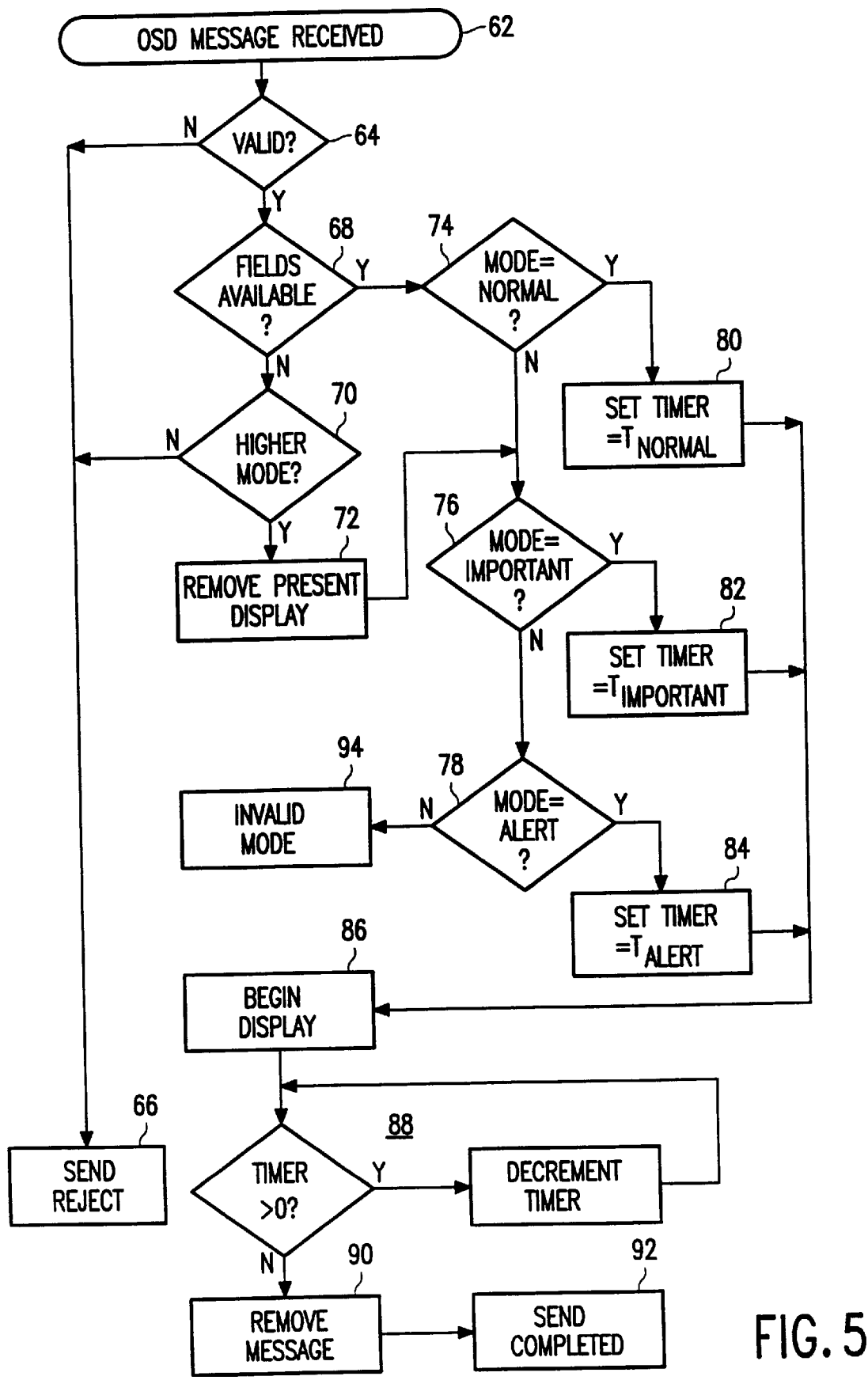
FIG. 5 is a flowchart illustrating OSD message control and timing.

FIG. 5 is a flowchart illustrating a number of the factors taken into account by the OSD function in the handling of OSD messages and commencing with the receipt of a message for display 62. A check (VALID?) 64 is made to ascertain whether message can be displayed (for example whether the display is inactive or in an emergency state) and, if not, a 'reject' message (SEND REJECT) 66 is sent as described previously.

If the message can be displayed, its length in terms of the number of fields required is determined and a check is made (FIELDS AVAILABLE?) 68 on the current display status to see whether there are sufficient presently unused display fields to accommodate the entire message. If an earlier received message is being displayed, such that there are insufficient free display fields to accommodate a later message, a comparison of the respective modes of the two messages (HIGHER MODE?) 70 is made to determine their relative "importance". If the earlier message has the same or a higher mode, the later message fails and the SEND REJECT stage 66 returns a 'reject' message to the originating subdevice of the later message. If however the later message has the higher mode, the earlier message is removed completely from display (REMOVE PRESENT DISPLAY) 72 thereby creating free display fields for the later message.

When there are free fields available (either originally or following removal of an earlier message) the mode of the message is determined as normal 74, important 76 or alert 78 and a message timer (not shown) is loaded with the appropriate message lifetime; $T_{NORMAL}$ (step 80), $T_{IMPORTANT}$ (step 82), or $T_{ALERT}$ (step 84).

Having set the timer, display of the message (BEGIN DISPLAY) 86 starts. A countdown loop 88, counts out the message lifetime and, on expiry, removes the message from display (step 90). Following removal, a "completed" message is sent (SEND COMPLETED) 92 to the originating subdevice as previously described.

As shown, a further check may be included at step 94 whereby messages with modes not satisfactorily identified as normal, important or alert are deemed invalid and a "not implemented" message is sent to the originating subdevice.

Setting of the display lifetime may be determined by the mode of the message as previously described thereby setting the display duration for that message. Alternatively, to reduce complexity in the OSD function, the OSD function may assign a fixed lifetime to all received messages regardless of their mode or originating device. In such a case, steps 74–84 of FIG. 5 may be replaced by a single step of setting the timer to a countdown time standardised for all messages.

In order to reduce conflicts, which may occur when a first message is being displayed and a second message is received by the display subdevice, the display subdevice manages the OSD messages in accordance with the following conditions:

the display subdevice treats each message as a single object, rather than as a set of separate lines to ensure that the display remains free from parts of previous messages and avoids the possibility of messages becoming mixed on screen;

accepts a command to display a message and determines whether display is possible depending on the size of the message and availability of display fields. An acknowledge message may then be transmitted to the originating subdevice indicating whether the message has been displayed;

a received OSD message will overwrite (that is to say completely replace) a previous message unless the display function determines that there are sufficient available display fields for the simultaneous display of both messages;

only one message at a time may be displayed per originating device or subdevice.

The above conditions, as implemented by the display subdevice, have advantages for the originating devices in that they are not required to search for free lines on the display, nor are they required to consider options supported by individual lines of the display, and they can send messages directly to the display subdevice without the prior step of issuing requests. An advantage to the user is that no partially overwritten messages can appear on the display.

From reading the present disclosure, other modifications will be apparent to persons skilled in the art. Such modifications may involve other features which are already known in the design, manufacture and use of local communication bus systems, domestic audio/video apparatuses and component parts thereof and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A local communication system comprising a plurality of devices interconnected for the communication of messages via one or more data channels, each device including at least one functional subdevice element, the subdevices in the system including a user output subdevice configured to display user-readable messages to a user of the system, wherein a user-readable message is determined by status information of a device, composed into a user-readable message by the subdevice element of that device, and transmitted directly or indirectly to the user output subdevice for display, characterised in that each user-readable message is assigned a display lifetime and, independently of the originating subdevice of a message, the user output subdevice is configured to time the message lifetime and remove the message from display on expiration of its lifetime.

2. A system as claimed in claim 1, wherein a user-readable message transmitted to the user output subdevice for display includes an identifier for the originating subdevice and, following receipt, the user output subdevice is configured to transmit a reply message directly or indirectly to the originating subdevice indicating whether or not the user-readable message has been displayed.

3. A system as claimed in claim 1, wherein a subdevice originating a user-readable message is configured to determine a display lifetime for that message and to include an indication of the lifetime in a message, and the user output subdevice is configured to detect the indication and apply the indicated lifetime.

4. A system as claimed in claim 3, wherein an originating subdevice includes timing means and is configured to resend a message to the user output subdevice within the lifetime of that message to extend the duration of its display.

5. A system as claimed in claim 1, wherein a subdevice originating a user-readable message is configured to specify a display mode for that message, and the user output subdevice is configured to assign a lifetime to a received message on the basis of its display mode.

6. A system as claimed in claim 3, wherein the user output subdevice is configured to determine and apply a lifetime to received user-readable messages not containing an indication of originator-set lifetime.

7. A system as claimed in claim 1, wherein the user output subdevice is configured to apply a uniform lifetime to each received user-readable message regardless of its originating device.

8. A display device for use in a system as claimed in claim 1, the display device configured to have the technical features of the user output subdevice of the system.

* * * * *